United States Patent [19]

Shapiro

[11] 4,416,656
[45] Nov. 22, 1983

[54] HARD SURFACING FOR A CENTRIFUGE CONVEYOR

[75] Inventor: Leonard Shapiro, Upper Darby, Pa.

[73] Assignee: Pennwalt Corporation, Philadelphia, Pa.

[21] Appl. No.: 366,102

[22] Filed: Apr. 6, 1982

Related U.S. Application Data

[63] Continuation-in-part of Ser. No. 877,056, Feb. 13, 1978, abandoned, which is a continuation-in-part of Ser. No. 136,123, Mar. 31, 1980, Pat. No. 4,328,925.

[51] Int. Cl.³ .............................................. B04B 1/20
[52] U.S. Cl. ..................................................... 494/53
[58] Field of Search ....................... 494/54, 55, 53, 52; 366/64, 342, 318, 319, 320, 156, 186

[56] References Cited

U.S. PATENT DOCUMENTS 3,764,062 10/1973 Brautigam ............................... 233/7
3,937,317 2/1976 Fleury .................................. 198/676
3,977,515 8/1976 Lewoczko ............................. 233/7
4,006,855 2/1977 Merzenich ............................. 233/7

FOREIGN PATENT DOCUMENTS 479872 2/1938 United Kingdom .
1266055 3/1972 United Kingdom .

Primary Examiner—Robert W. Jenkins
Attorney, Agent, or Firm—Edward A. Sager

[57] ABSTRACT

A centrifuge conveyor is provided with improved hard surfacing wherein assemblies of backing members and wear-resistant members are welded by the backing member to the conveyor. An assembly may be made unitary by providing a hole in either or both of the wear-resistant member and the backing member and securing them with means extending through the hole or holes. In the event that repair is necessary, an individual assembly may be replaced by welding technique, or the backing tile may be left in place and only the wear-resistant member replaced by removing and replacing the securing means. Each fragile wear-resistant member is braced against deflection at its outer portion through its backing member to the conveyor. The embodiments employ a plurality of wear-resistant members, each such member being accurately pressed from sintered tungsten carbide.

11 Claims, 8 Drawing Figures

HARD SURFACING FOR A CENTRIFUGE CONVEYOR

CROSS-REFERENCES TO OTHER APPLICATIONS

This application is a continuation-in-part of U.S. application Ser. No. 877,056, filed Feb. 13, 1978, now abandoned, in the name of the same inventor. Reference is also made to U.S. Ser. No. 136,123, filed Mar. 31, 1980, now U.S. Patent No. 4,328,925 granted May 11, 1982, in the name of the same inventor, as a continuation-in-part of U.S. application Ser. No. 877,056, now abandoned.

BACKGROUND

The present invention relates to centrifuges for separating solid-liquid mixtures, such centrifuges including a rotatable bowl and an abrasion-resistant screw conveyor within the bowl, rotatable on a common axis. More particularly, the present invention is directed to providing improved hard surfacing for the distal surfaces of the conveyor.

PRIOR ART

The present invention is an improvement upon the teachings of Frank C. Brautigam in U.S. Pat. No. 3,764,062, granted Oct. 9, 1973, assigned to the assignee of the present application, and Konrad Merzenich in U.S. Pat. No. 4,006,855, granted Feb. 8, 1977.

The Brautigam patent discloses a decanter centrifuge of the type to which the present invention is applied, and wherein hard surfacing is provided by a series of assemblies secured to the distal surfaces of the metal screw conveyor. Each assembly includes a performed backing tile made of a metal which is weldable to the conveyor, and a preformed wear-resistant member bonded to the backing tile. The assembly is secured to the conveyor by welding the backing tile to the conveyor flight.

The Merzenich patent discloses a spirally shaped carrier vane having a mounting piece secured to the face of the vane, and a wear plate secured to the mounting piece by securing means. The securing means includes a removable locking element between a first wear surface on the wear plate and a second wear surface on either the carrier vane or the mounting piece.

Although the Merzenich patent shows a construction in which the wear plate interengages the mounting piece, these parts are not subassembled before being attached to the carrier vane by inserts.

As will become apparent, the present invention seeks to combine strong mechanical securing means between the backing tile and the wear-resistant member with the known structural advantage of welding the backing tile to the conveyor. Unlike Brautigam wherein the member and tile are bonded the wear-resistant members and backing tiles of the present construction are mechanically secured when subassembled.

Among the differences between Merzenich and the present invention, interengagement of the wear plate with the mounting piece is not effected by Merzenich prior to mounting the wear plate on the conveyor whereas subassembly is possible and indeed is preferred with the present invention. The present invention also differs from Merzenich in that the tip of the fragile wear-resistant member is more solidly braced against axial deflection through the backing tile by the conveyor.

SUMMARY OF THE INVENTION

According to the present invention, improved hard surfacing is provided wherein assemblies of backing tiles and wear-resistant members are preferably initially subassembled, prior to welding to the conveyor, by securing means extending through a hole in one or both parts of the assembly. The present invention provides the option, however, of first welding the backing tile to the conveyor and then securing the wear-resistant member to its backing tile. Thus, dissimilar materials may be used in one subassembled part to achieve improved strength, durability and manufacturing efficiency at satisfactory cost.

In addition, by having the backing tile extend radially between the conveyor and the wear-resistant member, well beyond the distal surface of the conveyor, the distal tip portion of the wear-resitant member is braced against axial deflection. This reduces the chances that this fragile part of tungsten carbide will be fractured if it strikes a large, hard object in the solids moved by the conveyor.

The construction of the present invention lends itself well to precision manufacture, i.e. the backing tile may be an investment casting and the wear-resistant member may be formed in a powder metal press. Furthermore, in the event that repair is necessary, it is optional to replace one or more assemblies using welding technique, or to replace only the wear-resistant member by removing and subsequently replacing the securing means.

DRAWINGS

DETAILED DESCRIPTION

Figure 1:
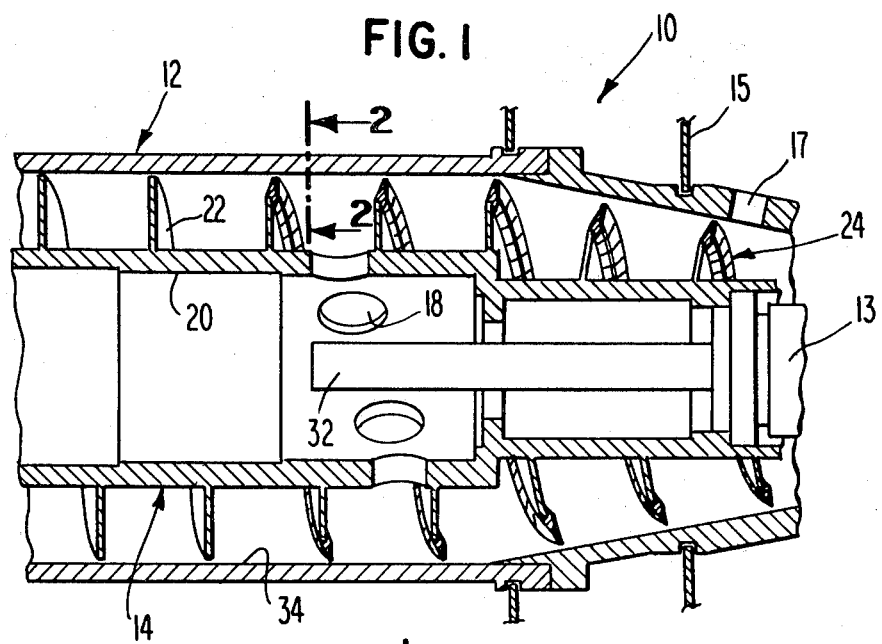
FIG. 1 is a fragmentary, longitudinal sectional view of a centrifuge embodying the invention.

A centrifuge embodying the invention is illustrated in vertical section in FIG. 1, and is designated generally 10. The centrifuge includes a rotatable tapered bowl 12 with a helically formed metal screw conveyor designated generally 14 therewithin, with the screw conveyor rotatable on a common axis with the bowl. During operation the bowl and conveyor are rotated at slightly different speeds by motor and gear means, which have been substantially broken away and are denoted 13. Bowl 12 rotates on bearings within a housing 15 (which has been largely broken away in FIG. 1), is of frustocylindrical configuration and includes a solids discharge port 17 in the frustum end thereof. Conveyor 14 includes a generally central hub 20 with helical flights 22 extending radially therefrom, generally along a line between the rotational axis and the distal surface of the conveyor. Mounted at the distal edges of flights 22 in or adjacent to the tapered end of the bowl 12 are a plurality of preferably abutting, and in any case at least closely spaced, abrasion-resistant surface assemblies designated generally 24; the relationship of these assemblies 24 to conveyor flight 22 is shown in FIG. 2.

During operation, an input slurry is introduced to the centrifuge through a feed tube 32 and passes through inlet port 18 in hub 20 into space between bowl 12 and conveyor 14. As the bowl and conveyor rotate, centrifugal forces cause the heavier, more dense solids to move radially outwardly with respect to the conveyor, to positions proximte the bowl interior surface 34. The conveyor, rotating at a slightly different speed than the bowl, moves the separated solids towards solids discharge port 17. Separated liquid moves to a liquid discharge port not shown.

Figure 2:
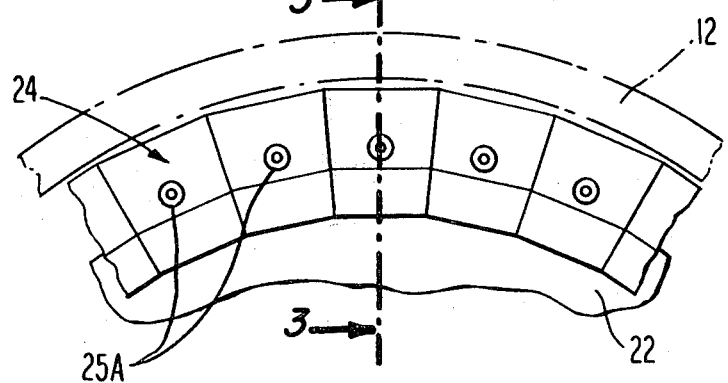
FIG. 2 is an enlarged view of a portion of a centrifuge conveyor, looking in the direction of the arrows 2—2 of FIG. 1.

Referring to FIG. 2, abrasion-resistant surface assemblies 24 are mounted at the distal outer edge of helical flight 22 of the conveyor outer edge. A plurality of assemblies 24 are mounted, preferably in abutting relationship, to present a preferably substantially continuous helical surface at the conveyor outer edge, to convey solids towards the solids discharge port and to resist abrasive wear due to the erosive character of the solids. Each assembly 24 is secured together mechanically and preferably is thereafter secured to the distal or outer edge of the conveyor 22 by welds 30, as shown in FIGS. 3 to 8. Mechanical fastening means minimize residual stresses in the abrasion-resistant material in the assemblies from dynamic stresses and strains which occur to the conveyor during centrifuge operation.

The various embodiments of the invention will be described first with respect to the features they have in common.

The improved hard surfacing 24 is provided by a preformed backing member 26 made of a metal which is weldable to the conveyor flight 22 by one or more welds 30. For example, both the backing member 26 and the conveyor 14 may be made of stainless steel. (A letter suffix will be omitted from the reference numerals 24,26 and 28 for purposes of general discussion). Each backing member 26 extends in radial outward direction substantially beyond the distal surface of the conveyor flight 22.

A preformed wear-resistant member 28 made of sintered tungsten carbide, engages the backing member 26 at a contact surface between them which, in use, extends along a helical line about the rotational axis generally following the distal edge of the conveyor 14. The distal portion of the wear-resistant member 28 extends in radial direction substantially beyond the distal surface of the conveyor flight 22 and, with the backing member 26 disposed between the conveyor flight 22 and the wear-resistant member 28, the distal end portion of the fragile wear-resistant member 28 is braced by the conveyor flight 22 through the backing member against deflection in axial direction towards the conveyor flight.

A passageway extends through at least one of the members 26, 28 to the contact surface between them, and a rivet, shank or other mechanical securing means extends through the passageway for securing the wear-resistant member 28 to the backing member 26. A unitary assembly 24 results which holds the wear-resistant member 28 against outward radial movement.

It is an advantage of the present invention that the welds 30 are accessible, so that it is one option to replace individual assemblies 24 if service or repair of the conveyor flight 22 is necessary. Another option is to replace a particular wear-resistant member 28 without removing its associated backing member 26 from the conveyor flight 22, as by drilling out, removing and replacing the securing means, e.g. rivet 150 in the embodiment of FIG. 2.

A plurality of passageways and securing means may be provided for each assembly 24, or if a single passageway and shank is employed the cross-section of the shank is non-circular, thereby preventing rotation of the wear-resistant member 28 relative to the backing member 26.

Figure 3:
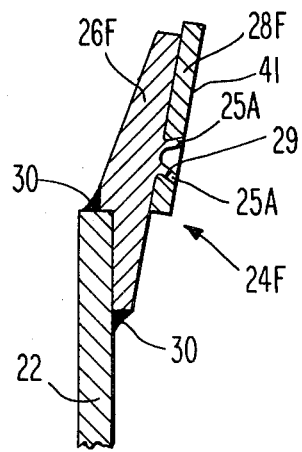
FIG. 3 is a sectional view taken along line 3—3 of FIG. 2.

FIG. 3 illustrates an embodiment of an abrasion-resistant surface assembly designated 24F having mechanical means for securing backing tile 26F and abrasion-resistant member 28F together wherein such means includes a protruding deformable means or shank 25A, preferably but not necessarily formed as a portion of backing tile 26F. Shank 25A preferably extends from a central area of backing tile 26F through a tapered passageway 29 in abrasion-resistant member 28F. Passageway 29 tapers to smaller diameter at the tile-member interface from a greater diameter at the abrasion-resistant member's solids displacing surface 41. When shank 25A is separated and the protions thereof are urged against the walls of passageway 29, the shank effectively resists radially outward and radially inward movement of the abrasion-resistant member with respect to the tile as the conveyor rotates. The tile 26F is secured to the conveyor helical flight, preferably via weldments 30. As a variation, passageway 29 need not extend entirely through abrasion-resistant member 28F; passageway 29 may also be configured as a cavity with a closed bottom. As a further variation, the configuration shown in FIG. 3 may be reversed. In such case, the passageway or cavity may be provided in the shock-absorbing backing tile, with a deformable protruding portion for insertion thereinto extending from the abrasion-resistant member portion for insertion thereinto extending from the abrasion-resistant member.

Figure 4:
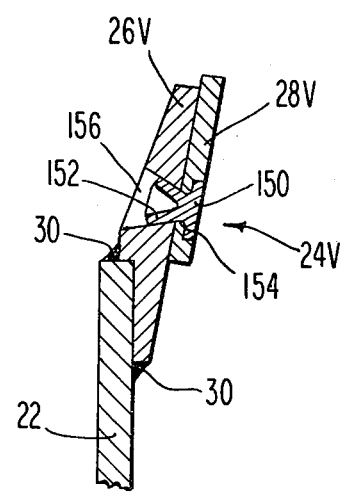
FIGS. 4–8 are views similar to FIG. 3, each showing a different modification of the construction shown in FIG. 3.

FIG. 4 illustrates another embodiment of a wear-resistant surface assembly designated generally 24V having mechanical means for securing the backing member 26V and wear-resistant member 28V together wherein such means includes a rivet 150 having a shank 152 in the passageway 156. The passageway 156 tapers through the backing member 26V, the contacting surfaces of both members, and at least part of the wear-resistant member 28V. The head of the rivet 150 resides in a counterbore 154 in the abrasion-resistant member which tapers in a direction opposite to the passageway 156. During assembly, the shank 152 is urged against the walls of passageway 156 in backing tile 26V, to retain abrasion-resistant member 28V in tight contact against backing member 26V. The shank 152 is of non-circular cross section or two securing means with rivets are used to secure the wear-resistant member to the backing member, in order to prevent the wear-resistant member from rotating with respect to the backing member. The backing member is secured to the conveyor flight 22, preferably via welds 30.

Figure 5:
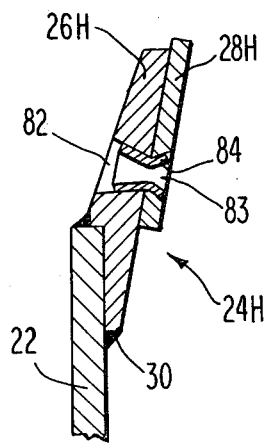

FIG. 5 illustrates an assembly 24H wherein a tubular rivet 84 secures wear-resistant member 28H to backing member 26H by extending through passageways 83 and 82 in the respective members and engaging the inner surfaces thereof. Passageways 83 and 82 are extensions of one another and are in mutually tapering relationship, i.e., passageway 83 extends through wear-resistant member 28H while tapering from its broad, exposed surface to its opposite surface, and passageway 82 extends through backing member 26H while tapering from its broad, exposed surface to its opposite surface in contact with member 28H. Assembly 24H is made by inserting rivet 84 into passageways 82 and 83, after wear-resistant member 28H has been positioned on backing member 26H so as to align the two passageways at the interface of both members and next expanding rivet 84 against the walls of passageways 82 and 83 by a suitable hand or machine tool. If desired, as a variation either or both of passageways 82 and 84 may be configured as cavities with closed bottoms and, instead of a tubular rivet 84, a solid plug, secured in the cavities by an adhesive, may be substituted.

Figure 6:
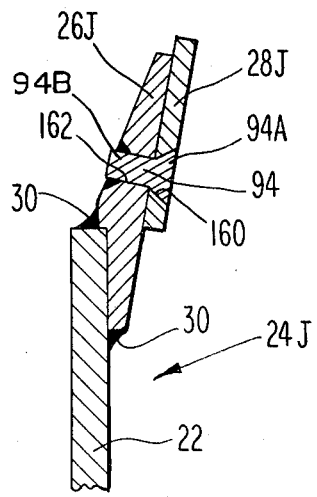

FIG. 6 illustrates another embodiment of the invention designated generally 24J wherein the means securing backing member 26J and wear-resistant member 28J is a hard-surfaced rivet 94, preferably with a countersunk head portion 94A disposed in a countersunk passageway 160 through wear-resistant member 28J and with a shaft portion 94B disposed in a passageway 162 through backing member 26J. After insertion in the passageways, rivet 94 is welded to backing member 26J. The countersunk configuration of the head of rivet 94 and the corresponding countersunk passageway 160 serve to retain the wear-resistant member in position once the rivet is welded to the backing member. Preferably two rivets 94 are used in order to prevent the wear-resistant member 28J from rotating relative to its backing member 26J. The backing member 28J is secured to the conveyor flight 22 by welds 30. As a variation, either passageway 160 or passageway 162 may be configured as a cavity with a closed bottom, with the rivet 94 passing through the remaining passageway and into the cavity. The rivet may also be secured with adhesives, or the cavity may be tapped and a machine screw substituted for the rivet.

Figure 7:
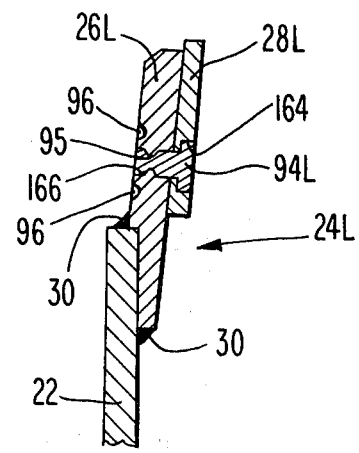

Shown in FIG. 7 is an assembly 24L wherein the means for securing backing member 26L and wear-resistant member 28L includes a hard-surfaced rivet 94L fitted into a counterbored passageway 164 in wear-resistant member 28L, with rivet 94L passing through and into a passageway 166 formed in the backing member 26L. Rivet 94L has formed therein an annular depression or waist 95 into which a portion of backing member 26L is swaged in order to secure together the component parts of assembly 24L. Swaging forces material of the backing member into the waist 95 and leaves a depression 96 in the rear surface of backing member 26L. The backing member 26L is secured to the conveyor flight 22 by welds 30. Hardsurfaced rivet 94L is at least partially disposed in counterbored passageway 164 through member 28L and swaged into engagement with passageway 166 through the backing member; and it prevents radially outward movement of the wear-resistant member relative to the conveyor hub 20 as the conveyor rotates.

Figure 8:
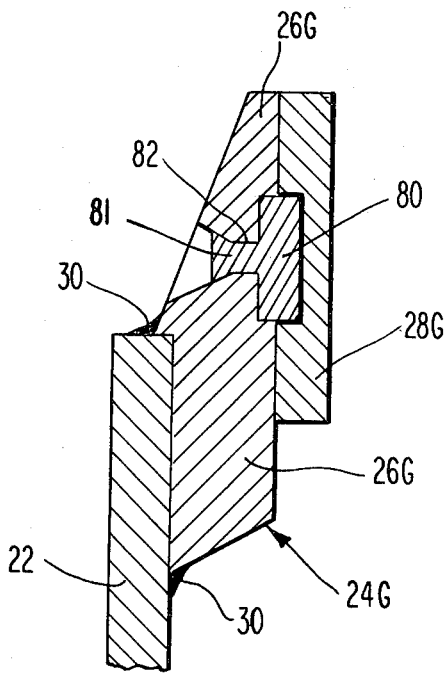

FIG. 8 illustrates another emobidment of wear-resistant surface assembly designated generally 24G wherein the mechanical means for securing backing member 26G and wear-resistant member 28G includes a rivet 80 secured to wear-resistant member 28G, preferably by brazing, with the brazing done so that the braze material is entirely between rivet 80 and wear-resistant member 28G so corrosive materials being separated within the centrifuge cannot attack the braze material. The rivet 80 connects the wear-resistant member to the shock-absorbing backing mbmber by its shank 81 which resides in at least a portion of passageway 82 through backing member 26G. The passageway 82 through the backing member 26G is tapered toward the wear-resistant member 28G and the contact surface between the two members 26G and 28G from conveyor side of the backing member 26G. The shank 81 is deformed at the end thereof to form a second rivet head within a counterbore of the passageway 82, as shown, or it may be welded against the interior walls of passageway 82 during fabrication of the wear-resistant assemblies. Adhesives may also be used to secure the shaft 81 of rivet 80 to backing tile 26G and to secure rivet 80 to wear-resistant member 28G; however brazing may also be used. Backing tile 26G is secured to conveyor flight 22, preferably by welds 30. As in the embodiment of FIG. 4 the rivet 80 of the embodiment of FIG. 8 is capable of preventing movement of the abrasion-resistant member radially outwardly with respect to the conveyor hub 20.

From the foregoing it can be seen that improved hard surfacing for a centrifuge conveyor has been provided which retains an advantage of Brautigam U.S. Pat. No. 3,764,062, in that the wear-resistant member 28 and backing member 26 may be secured by a shank, rivet or other mechanical securing means to form sub-assembly 24 which may be individually welded to the conveyor flight. As an added advantage, however, the wear-resistant means may be replaced after removing the securing means, and preferably the backing member may be left in place while the wear-resistant member and finally the securing means are replaced.

I claim:

1. Improved hard surfacing for a helically formed, metal screw conveyor of a centrifuge, said conveyor extending in outward radial direction along a line between its rotational axis and its distal surface relative to said axis, said conveyor being rotatable transverse to said radial line about said axis, comprising:
   a. a series of preformed backing member made of a metal which is weldable to said conveyor
   b. a weld holding said backing member to said conveyor, with each backing member extending in radial direction substantially beyond the distal surface of said conveyor,
   c. a preformed wear-resistant member, engaging its associated backing member at a contact surface between them which, in use, extends along a helical line about said axis generally following the distal edge of said conveyor,
   d. said wear-resistant member having a distal portion extending in radial direction substantially beyond the distal surface of said conveyor, with said backing member disposed between said conveyor and said wear-resistant member, the distal portion of said wear-resistant member being braced by said conveyor through said backing member against deflection in axial direction towards said conveyor,
   e. a passageway for each associated wear-resistant member and backing member, extending through at least one of said members to said contact surface between them,
   f. and securing means extending through each passageway for securing each wear-resistant member to its associated backing member, thereby providing a unitary assembly of said members and holding said wear-resistant member against movement in radial direction,
   g. said weld being accessible for unitarily replacing said assembly.

2. Hard surfacing according to claim 1 wherein said securing means is removable, whereby a wear-resistant member optionally may be replaced without removing its associated backing member from said conveyor.

3. Hard surfacing according to claim 1 wherein said passageway is formed in said wear-resistant member, and said contact surface is on said backing member facing said wear-resistant member, said securing means being formed on said contact surface extending through said passageway and securing the wear-resistant member to the backing member.

4. Hard surfacing according to claim 3 wherein said securing means is a deformable member which is deforamable for securing said members together.

5. Hard surfacing according to claim 1 wherein said pasageway is formed in said wear-resistant member and said backing member and extends through said contact surface, said securing means extending through said passageway and securing the wear-resistant member to the backing member.

6. Hard surfacing according to claim 5 wherein said passageway includes at least one portion which tapers toward said contact surface, and said securing means is deformable on at least one end thereof into engagement with said passageway.

7. Hard surfacing according to claim 6 wherein said securing means is a rivet.

8. Hard surfacing according to claim 1 wherein said passageway is formed in said backing member, and said contact surface is on said wear-resistant member facing said backing member, said securing means extending through said passageway and securing the wear-resistant member to the backing member.

9. Hard surfacing according to claim 8 wherein said securing means has a shank extending through said passageway and a head larger than said shank secured to said wear-resistant member.

10. Hard surfacing according to claim 9 wherein said shank is deformed to secure said wear-resistant member to said backing member.

11. Hard surfacing according to claim 10 wherein said head is metallurgically bonded to said wear-resistant member on the surface thereof facing said contact surface.

* * * * *